United States Patent
Swenson et al.

[11] Patent Number: 5,916,605
[45] Date of Patent: *Jun. 29, 1999

[54] VALVE ACTUATED INJECTION MOLDING APPARATUS

[75] Inventors: Paul M. Swenson, South Hamilton; Christopher W. Lee, Burlington, both of Mass.

[73] Assignee: Dynisco HotRunners, Inc., Gloucester, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/721,808

[22] Filed: Sep. 27, 1996

[51] Int. Cl.$^6$ ...................................................... B29C 45/23
[52] U.S. Cl. ........................ 425/564; 264/328.9; 425/566
[58] Field of Search ................................... 425/562, 563, 425/564, 565, 566; 264/328.9

[56] References Cited

U.S. PATENT DOCUMENTS

| | | |
|---|---|---|
| 4,268,241 | 5/1981 | Rees et al. . |
| 4,286,941 | 9/1981 | Gellert . |
| 4,303,382 | 12/1981 | Gellert . |
| 4,449,915 | 5/1984 | van den Brink . |
| 4,497,621 | 2/1985 | Kudert et al. . |
| 4,512,730 | 4/1985 | Kudert et al. . |
| 4,518,344 | 5/1985 | Latreille et al. . |
| 4,663,811 | 5/1987 | Gellert . |
| 4,712,990 | 12/1987 | Kudert et al. . |
| 4,786,246 | 11/1988 | Gellert . |
| 4,787,840 | 11/1988 | Gellert . |
| 4,892,699 | 1/1990 | Kudert et al. . |
| 4,895,504 | 1/1990 | Kudert et al. . |
| 4,919,606 | 4/1990 | Gellert . |
| 4,925,100 | 5/1990 | Kudert et al. . |
| 4,931,246 | 6/1990 | Kudert et al. . |
| 4,934,915 | 6/1990 | Kudert et al. . |
| 4,946,365 | 8/1990 | Kudert et al. . |
| 5,037,285 | 8/1991 | Kudert et al. . |
| 5,104,307 | 4/1992 | van den Brink . |
| 5,192,556 | 3/1993 | Schmidt . |
| 5,334,008 | 8/1994 | Gellert ..................................... 425/566 |
| 5,499,916 | 3/1996 | Schad et al. . |
| 5,513,976 | 5/1996 | McGrevy ................................. 425/549 |
| 5,523,045 | 6/1996 | Kudert et al. . |
| 5,533,882 | 7/1996 | Gessner et al. . |
| 5,695,793 | 12/1997 | Bauer ....................................... 425/564 |

FOREIGN PATENT DOCUMENTS 0 714 748 A1   5/1996   European Pat. Off. .

OTHER PUBLICATIONS

Extrusion Dies for the Discharge of a Single Melt, pp. 146–154.

*Primary Examiner*—Tim Heitbrink

[57] ABSTRACT

A valve gated injection molding system to facilitate improved melt flow to the gate of the nozzle. The system includes an annular flow insert through which the valve pin passes. The annular flow insert includes an annular groove on its outer surface. The edge of the annular groove is spaced from the wall of the melt channel so that some of the melt can flow longitudinally between the edge of the groove and the wall, while the remainder of the melt flows in the groove. The flow direction initiated by the annular flow insert eliminates flow separation and dead spots about the valve pin. The system also includes an actuator assembly including a sled attached to the valve pin.

28 Claims, 11 Drawing Sheets

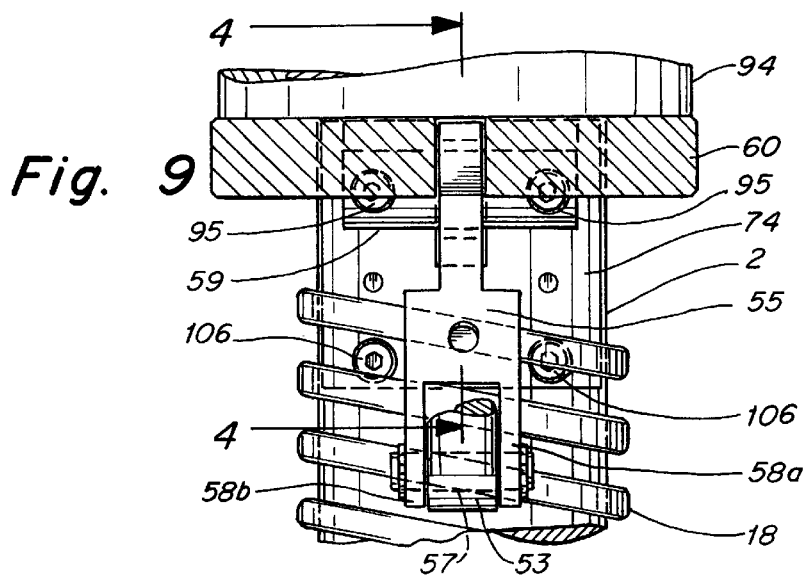
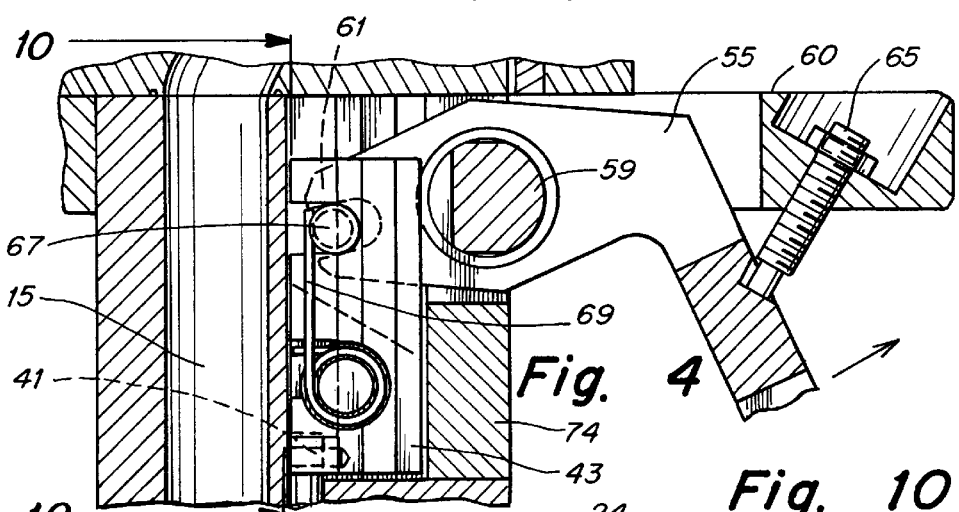
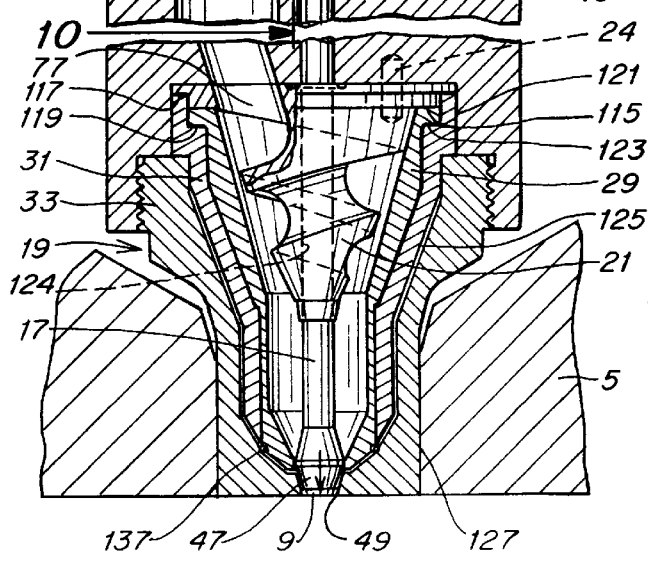
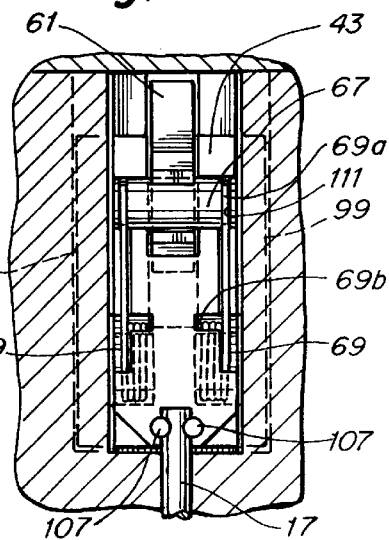

VALVE ACTUATED INJECTION MOLDING APPARATUS

BACKGROUND OF THE INVENTION

1. Field of the Invention

The present invention relates in general to an injection molding system. More particularly, the present invention relates to an improved injection molding apparatus characterized in particular by a valve actuated assembly that utilizes a flow insert for facilitating annular melt flow about the valve pin.

2. Discussion of the Related Art

Valve actuated injection molding nozzles are used to keep the melt at process temperature between the extruder nozzle and the gate, and also used to actuate a valve pin that opens and closes the gate. In the closed position, the valve forms a seal to stop melt from flowing into the cavity, while in the open position the valve is retracted away from the gate of the cavity and melt flow into the cavity is permitted.

A problem with valve gated injection molding is that when the valve is open the melt flows about the valve pin and a "dead" spot can be created behind the valve pin. A dead spot is an area where the melt is not flowing at the same rate as the surrounding melt flow. The presence of a dead spot leads to some of the melt being exposed to the heat from the heated nozzle longer than the rest of the melt. Consequently, the melt from the dead spot can degrade more than the rest of the melt, and have a different coloration, consistency, and temperature than the rest of the melt. This can cause streaks to appear in the finished plastic article. Furthermore, the slow moving melt in the dead spot can mix with a new color when the user wishes to change color. This requires greater time to clean out the old color before articles having the new color can be made without streaks of the old color appearing in the article.

An additional problem is created when the melt flow is directed about the valve pin. The valve pin tends to interrupt or separate the flow of the melt traveling to the gate. The melt, however, often will not properly recombine at the gate after it is separated by the valve pin, causing weld lines to appear in the plastic article.

Another problem with valve gated assemblies is the force used to actuate the valve. Actuators often are required to exert a great deal of force to open and close the valve, due to the frictional forces involved. Often, the forces exerted by the actuator are transmitted unnecessarily in a direction different from the direction that the valve pin is traveling, due to poor design of the valve pin actuator assembly. Consequently, these forces wear on and reduce the life of the actuator and the valve pin assembly.

In view of the foregoing, it is object of the present invention to provide an injection molding system having an improved melt flow direction about the valve pin, that eliminates dead spots in the melt flow.

It is a further object of the invention to provide an injection molding system having an improved melt flow direction about the valve pin that eliminates weld lines caused by interruption of the melt flow by the valve pin.

It is a further object of the invention to provide an actuator apparatus that transmits forces to the valve pin actuator in the direction the valve pin is moving, without creating frictional force components normal to the movement of the valve pin.

SUMMARY OF THE INVENTION

In one illustrative embodiment of the invention an injection molding apparatus is provided that includes a nozzle body having a melt channel extending therethrough and terminating at a nozzle gate, a valve pin for interrupting melt-flow at the nozzle gate, an actuator coupled to the valve pin for causing longitudinal displacement of the valve pin, and a flow insert adjacent the nozzle gate and through which the valve pin extends. The flow insert has an outer surface with an annularly directed groove disposed therein for directing melt-flow thereabout and toward the nozzle gate.

In another illustrative embodiment of the invention an injection molding apparatus is provided that includes a nozzle body having a melt channel extending therethrough and terminating at a nozzle gate, a valve pin for interrupting melt-flow at the nozzle gate, and an actuator coupled to the valve pin for causing longitudinal displacement of the valve pin. The actuator includes a sled coupled to the valve pin that is slidably movable in the longitudinal direction within a recess in the nozzle body, and an arm fixedly engaged with the sled so that rotation of the arm causes longitudinal displacement of the sled.

BRIEF DESCRIPTION OF THE DRAWINGS

FIG. 4 is an enlarged fragmentary view of the injection molding system of FIG. 2 along lines 4—4 of FIG. 9;

FIG. 9 is a fragmentary side view of the injection molding system of FIG. 3 taken along lines 9—9 of FIG. 3;

FIG. 10 is a fragmentary cross-sectional view of the injection molding system of FIG. 4 taken along lines 10—10 of FIG. 4;

DETAILED DESCRIPTION

Figure 1:
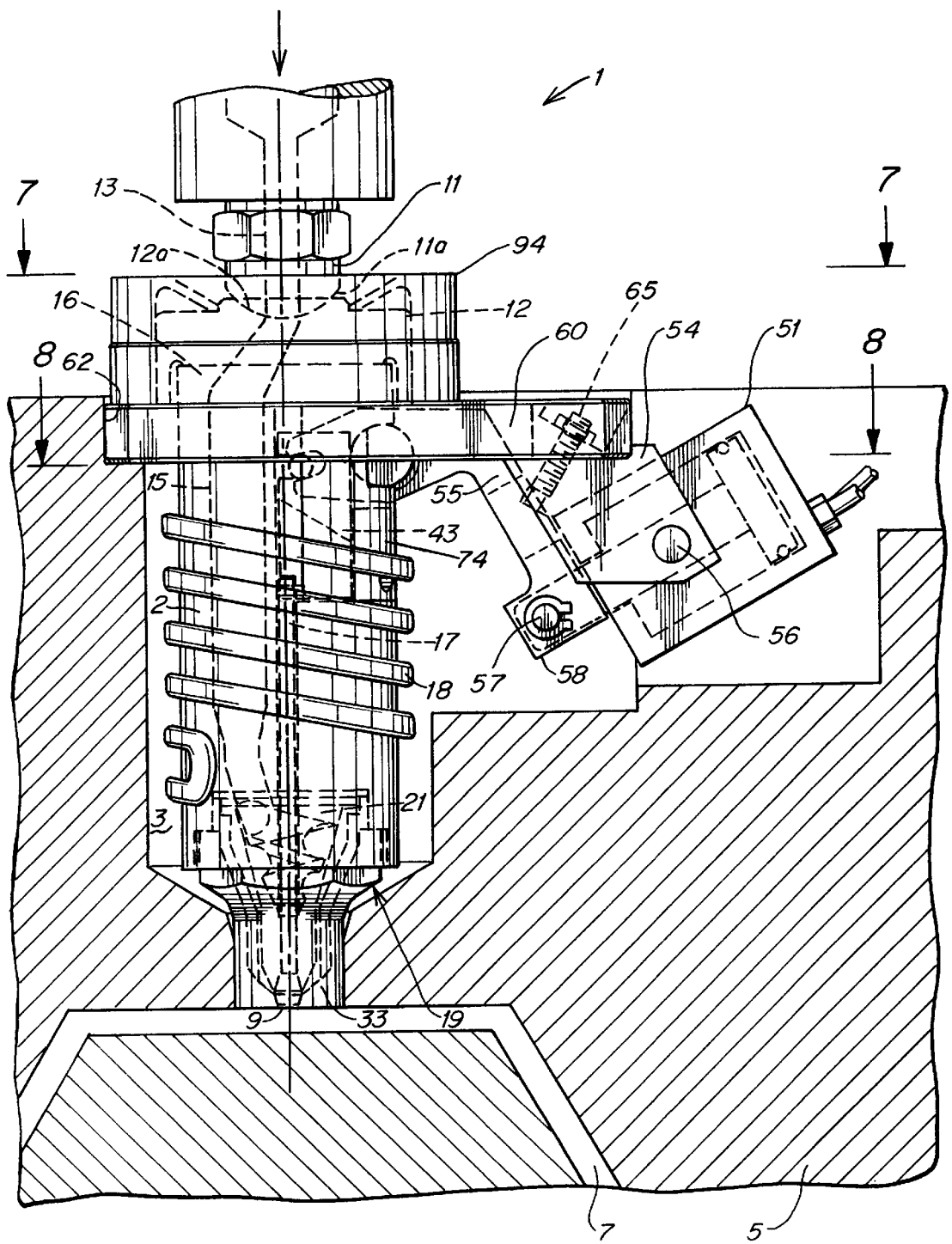
FIG. 1 is a side view of an illustrative embodiment of the injection molding system of the present invention.
Figure 2:
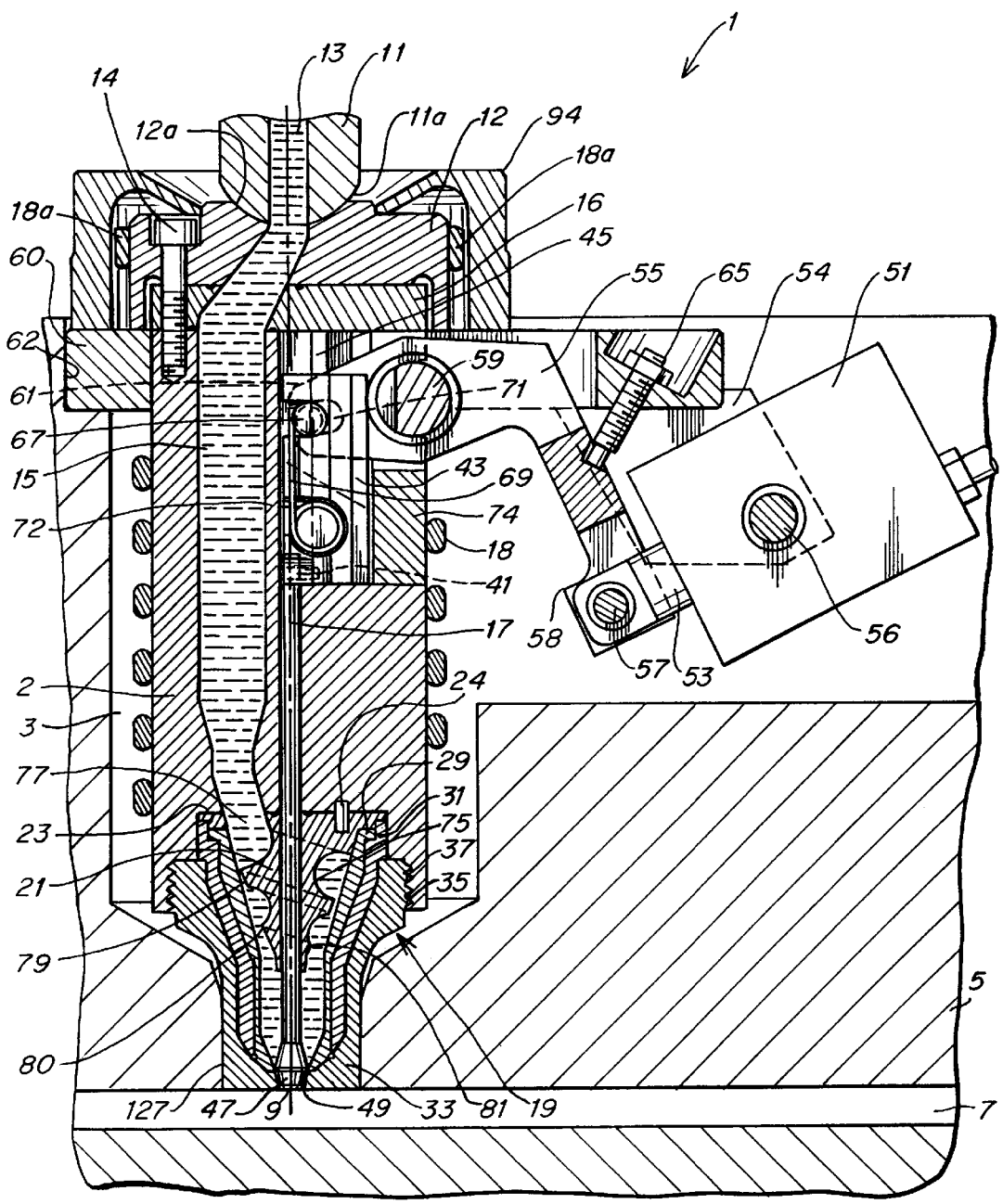
FIG. 2 is a cross-sectional side view of the injection molding system of FIG. 1, with the valve pin in the closed position.
Figure 3:
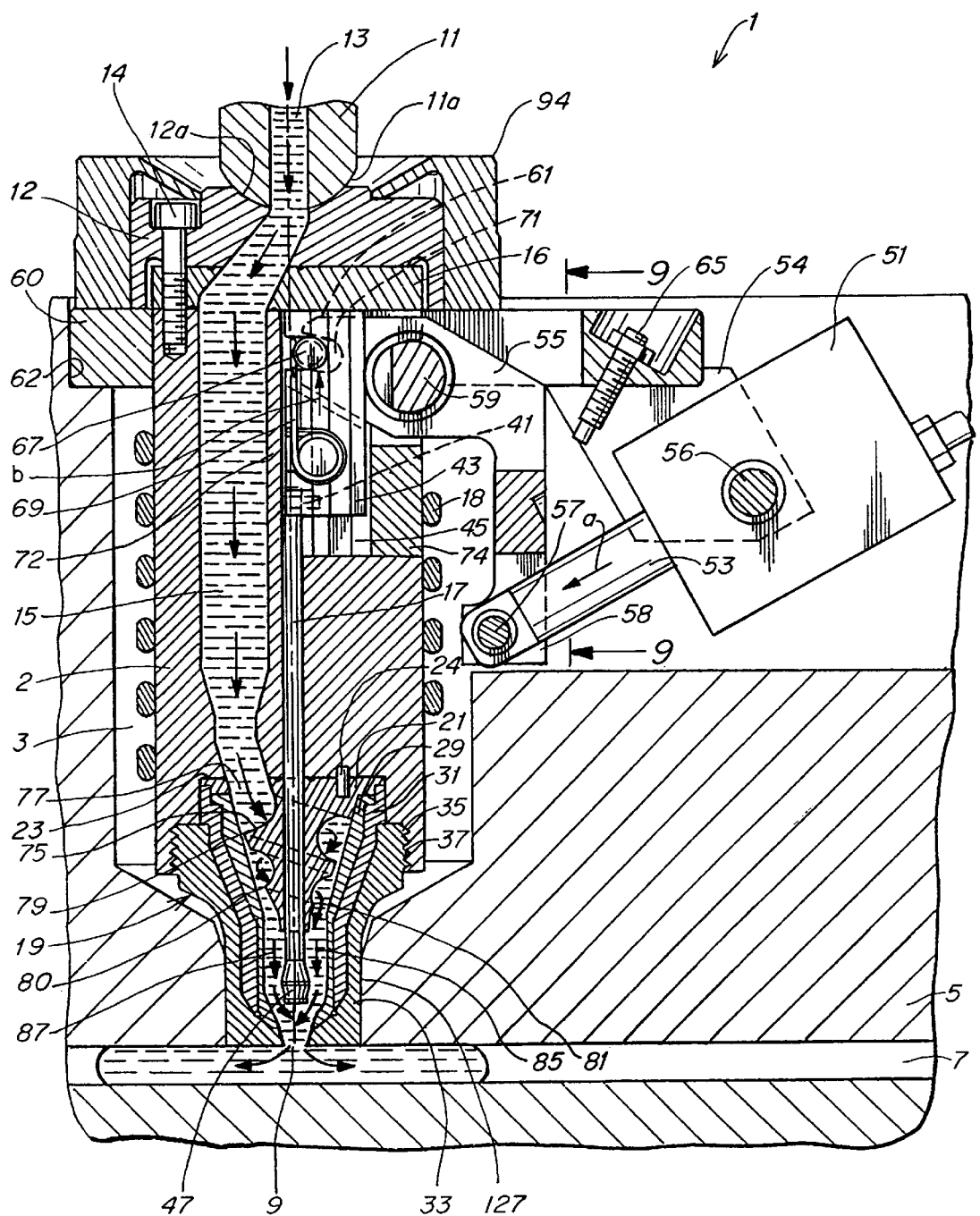
FIG. 3 is the cross-sectional view of FIG. 2, with the valve pin in the open position.

The present invention relates to a valve gated injection molding system. FIGS. 1–3 show one illustrative embodiment of the injection molding system 1 of the present invention. Although one system is shown in the figures, the system 1 could be used in a multiple gate system, in which several of the injection molding system 1 are coupled to a manifold with a central inlet coupled to multiple nozzles. FIGS. 1–3 show views of the illustrative embodiment of the injection molding system of the present invention. In the figures, an injection molding nozzle body 2 is shown disposed in a recess 3 of a mold 5 for making a plastic article. The plastic article is formed in a cavity 7 in the mold by injecting plastic melt from a gate 9 of the injection molding nozzle body 2. Liquefied melt is received from an extruder nozzle 11 of an injection molding machine (not shown). A passage 13 of the extruder nozzle 11 feeds into a bore 15 in the nozzle body via a mating inlet 12 and a transition piece 16. The mating inlet 12 has an inwardly curved surface 12a to mate with the outwardly curved surface 11a of the extruder nozzle 11. Alternatively, the surface 12 a of the mating inlet 12 and the surface 11a of the extruder nozzle 11 maybe formed flat. A screw 14 attaches the mating inlet 12 to the nozzle body 1 via the transition piece 16. A helical heater 18 is disposed about the nozzle body to keep the plastic melt at the desired flow temperature. Heat is transferred from the helical heater 18 through the nozzle body 2 to the bore 15 which contains the melt flow. Other means can be used to heat the nozzle and melt, such as a band heater. As shown in FIG. 2, another heater 18a can be disposed about the mating inlet 12. The bore 15 is slightly offset within the nozzle body 2 to accommodate the valve pin 17 and the actuator assembly described hereinafter.

The bore 15 of the nozzle body 2 feeds into a four-piece end assembly 19 seated in the nozzle body 2. The assembly 19 is made up of four discrete pieces. An annular flow insert 21 is seated in an annular recess 23 in the nozzle body. The annular flow insert 21 is aligned in the nozzle with locating pin 24, which is press fit in a recess of the nozzle body, and a recess of the insert 21. The insert 21 is used to direct the flow of melt to the gate 9 of the nozzle body. The assembly further includes an inner insert 29, an outer insert 31 that substantially surrounds the inner insert, and a tip 33 that substantially surrounds the outer insert, respectively. The tip 33 has threads 35 on a portion of its outer surface, which are received by threads 37 on an inner surface of the recess 23 in the nozzle body for receiving the assembly 19. The tip 33 is screwed into the nozzle body and holds the four piece assembly 19 in place.

The annular flow insert 21 is hollow to accommodate the valve pin 17 that passes therethrough. The valve pin 17 is slidably movable in the hollow passage of the insert 21. The insert 21 and the valve pin 17 are constructed to create a seal that prevents melt from escaping between the valve pin and the inner surface of the hollow passage through the insert 21 and into the nozzle body. The valve pin 17 is coupled at 41 to a sled 43 which occupies a recess 45 in the nozzle body 2. Due to the seal between the valve pin 17 and the passage through the insert, melt cannot enter into and damage the actuator assembly in recess 45 of the nozzle body where the sled 43 is located. The sled is slidably movable along the longitudinal axis of the nozzle body. FIG. 1 shows the valve pin 17 in the closed position. In the closed position the end 47 of the valve pin forms a seal with an inner surface 49 of the tip 33. Thus, no melt passes into the cavity 7 when the assembly is in the closed position.

The actuator assembly includes a hydraulic or pneumatic cylinder 51, shown in FIGS. 1 and 2, with its piston 53 completely retracted. The cylinder 51 is fixedly attached to the nozzle body 2 by a pair of arms 54, which are attached on either side of the cylinder by rods 56, or any appropriate attachment means. The arms 54 are attached to and extend from a mounting plate 60 which supports the entire system 1. The piston 53 is pivotally mounted to an arm 55 of the actuator assembly by a pin 57 that passes through both an end of the piston 53 and an end 58 of the arm 55 to create a pivot point. The arm is also pivotally mounted to a rod 59 which passes through the arm. In the retracted position, the counter-clockwise rotational movement of the arm 55 about rod 59 is limited by a set screw 65. The set screw 65 is used to set the movement of the valve pin 17 so that the gate 9 is not damaged by the valve pin moving too far in the longitudinal direction when being closed. Furthermore, the valve pin is set to extend far enough to create a good seal with the tip 33, or melt flow will not be stopped, and vestige or drooling will occur at the gate. At one end, the arm 55 has a jaw 61 that engages a pin 67 mounted in the sled 43. The pin 67 rolls simultaneously on both the sled 43 and the jaw 61 transmitting force from the jaw to the sled. The pin 67 is held in place by a pair of torsion springs 69, only one of which can be seen in the cross-sectional view of FIGS. 2 and 3. A sled retaining wall 74.covers a portion of the recess 45 cut out of the nozzle body 2 to accommodate the sled 43 and the motion of the arm 55.

In order to fill the mold cavity 7 with melt, the cylinder 51 is controlled to force the piston 53 away from the cylinder, as shown by arrow a of FIG. 3, thereby causing clockwise rotation of the arm 55 about the pivot axis formed by the rod 59. The rotational movement of the arm 55 causes the jaw 61 to impart a force on the pin 67 in the longitudinal direction away from the gate 9, which in turn causes the sled, which is slidably mounted in the nozzle body 2, to move away from the gate in the longitudinal direction, as shown by the arrow b of FIG. 3. The pin 67 is engaged with, and rotates with, the arm 55, transmitting forces along the longitudinal axis of the nozzle body to the sled 43, without transmitting frictional force components normal to the direction of travel of the sled 43. As stated above, the valve pin 17 is fixedly attached to the sled 43 at 41, and is pulled away from the gate as the sled slides upward, to the open position shown in FIG. 3, to permit melt to flow through the gate 9 and into the cavity 7. As seen in the respective open and closed positions of FIGS. 2 and 3, the jaw 61 has a space 71 to permit movement of the pin 67 within the jaw. When moving from the open position to the closed position, or vice versa, as the sled begins to move, and the arm begins to rotate, the end of the jaw will move laterally closer to the wall 72 of the nozzle body. To avoid having the inner surface of the jaw press against the pin 67, the space 71 is provided, which is occupied by the pin 67 when the arm 55 is halfway between the open and closed positions.

FIG. 3 shows the flow of the melt within the bore 15 and the end assembly 19. The bore 15 of the nozzle body feeds into an opening 77 formed in the annular flow insert 21. The annular flow insert 21 includes a spiral groove 75 to facilitate a partial spiral flow through the assembly 19. After entering opening 77 in the insert 21, a substantial portion of the melt flow is directed along the spiral groove 75, because near the top of the insert closest to the opening 77 the outer edge of the groove 79 is quite close to the inner wall of the inner insert 29. Thus, only a small amount of the melt escapes longitudinally toward the gate between the wall of the inner insert 29 and the outer edge of the groove 79. The depth of the groove 75 constantly decreases along the length of the insert 21, as the insert extends toward the gate 9. Also, the outer edge of the groove (80, 81) tapers away from the wall of the inner insert 29. Because of the foregoing groove construction, the spiral melt flow steadily decreases along the length of the insert 21, and the longitudinal melt flow increases, so that in the flow areas indicated by arrows 85 and 87 of FIG. 3, when the flow first contacts the valve pin 17, the flow is substantially entirely longitudinal toward the gate, and is not subject to separation by the valve pin 17. Thus, this groove construction eliminates dead spots and flow separation about the valve pin 17 and results in good mixing of the flow resulting in a thermally homogeneous melt of uniform flow rate and consistency delivered to gate 9. Although one opening 77 and groove 75 is used on the insert in this embodiment, the invention is not limited to a single opening and groove, as multiple openings and grooves could be formed in the insert 21, to direct the melt flow in different directions.

Figure 5:
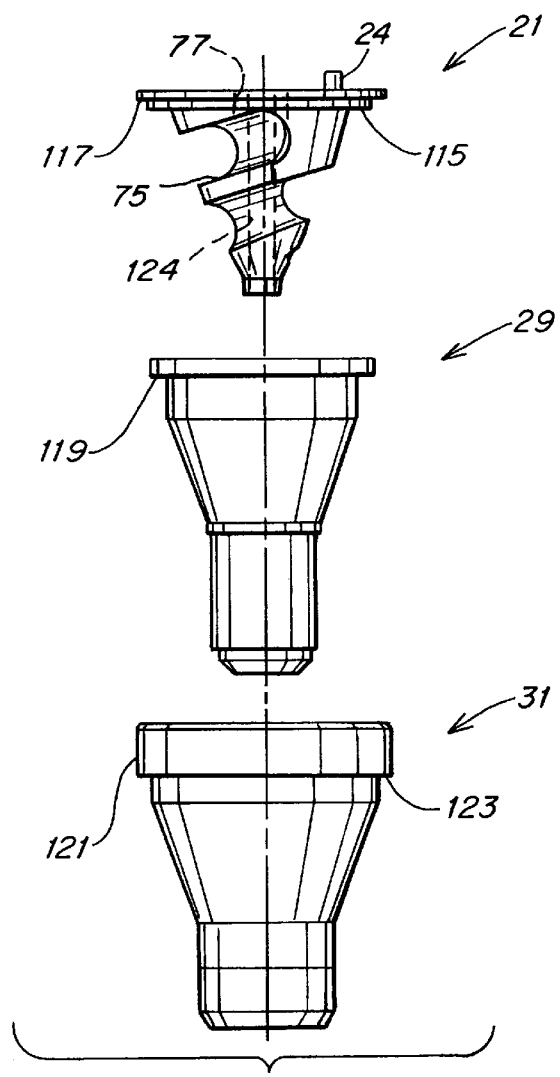
FIG. 5 is an exploded view of the end assembly of FIGS. 1–4.

The insert assembly 19 is shown in greater detail in the enlarged fragmentary view of FIG. 4 and the exploded view of FIG. 5. The annular flow insert 21 is preferably formed of a erosion-resistant material such as hardened steel, to protect the annular flow insert against the constant flow of melt, which can tend to wear away softer materials. The inner insert 29 is seated on a ledge 115 of the annular flow insert. The inner insert 29 is also preferably formed of hardened steel, as like the annular flow insert, it is constantly exposed to melt flow. The outer insert 31 is seated on ledges 117 and 119 of the annular flow insert and the inner insert, respectively. The outer insert 31 is machined so as to be essentially form fitted about the inner insert 29 to facilitate heat transfer from the heated nozzle to the melt flow path. The heated nozzle contacts the outer insert along surface 121. The outer insert 31 is preferably formed of a highly heat conductive material, such as beryllium copper, so that heat is effectively transferred along its length from where the outer insert contacts the nozzle at 121. The tip 33 holds the assembly in place by contacting surface 123 of the outer insert. Other than this small contact area, necessary to keep the assembly in place, the outer insert and the tip do not contact one another, and an air gap 125 is formed between the inserts. The air gap is desirable as it insulates the outer insert from the tip and thereby prevents heat loss from the outer insert to the tip, which is in direct contact with and forms a seal with the cooled mold at 127 (see FIG. 4). The tip is preferably formed of a low heat conductive material such as stainless steel, to minimize heat loss from the insert assembly 19 to the mold 5. An O-ring seal 137 having a C-shaped cross-section prevents melt from escaping into the insulative air space 125.

Figure 6:
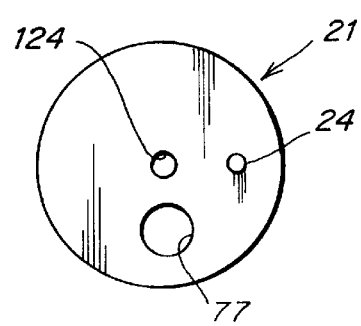
FIG. 6 is a top plan view of the annular flow insert of FIGS. 1–5.

FIG. 6 shows a top plan of the annular flow insert 21. Melt flow is directed into opening 77 which is offset from the center and leads to the groove channel 75 described above. Passage 124 through which the valve pin 17 passes and forms a seal with is at the center of the insert. Locating pin 24 is also offset from the passage 124.

Figure 7:
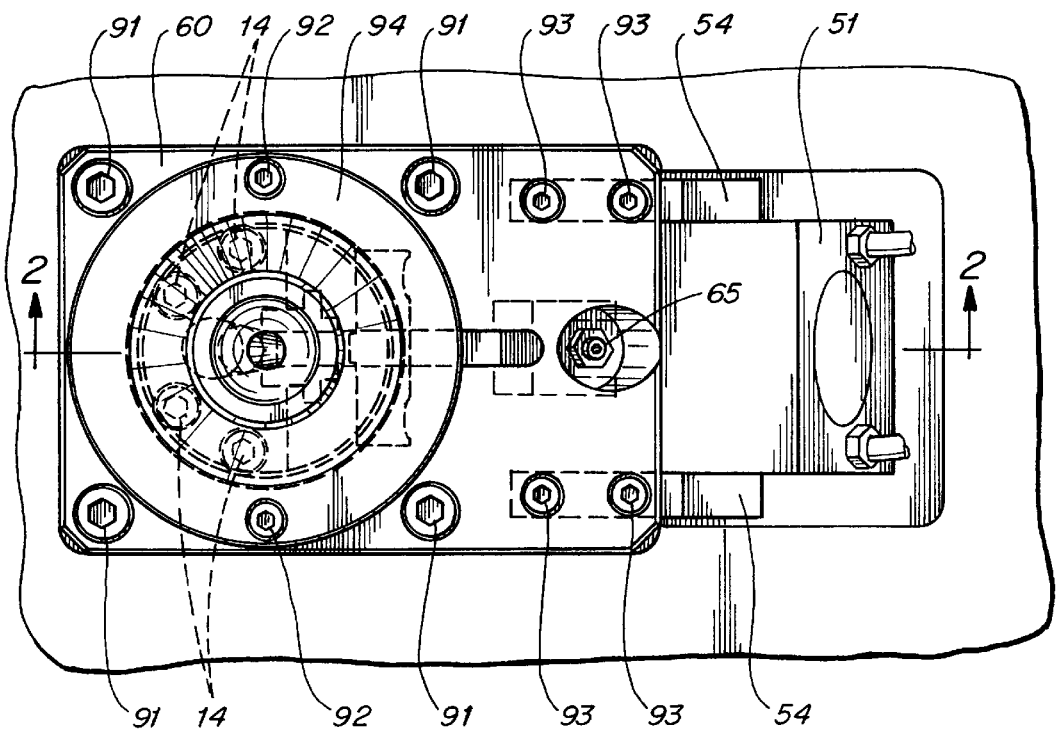
FIG. 7 is a top plan view of the injection molding system of FIG. 1 taken along lines 7—7 of FIG. 1.

The injection molding system 1 is secured to the mold 5 via a mounting plate 60. The mounting plate is received in a recess 62 in the mold 5. FIG. 7 shows a top plan view of the injection molding system along lines 7—7 of FIG. 1. Screws 91 are used to attach the injection molding system 1 to the mold via mounting plate 60. Arms 54 which connect the cylinder actuator 51 to the system, are connected to the mounting plate 60 via screws 93. Screws 92 are used to secure the locating ring 94 to the mounting plate 60.

Figure 8:
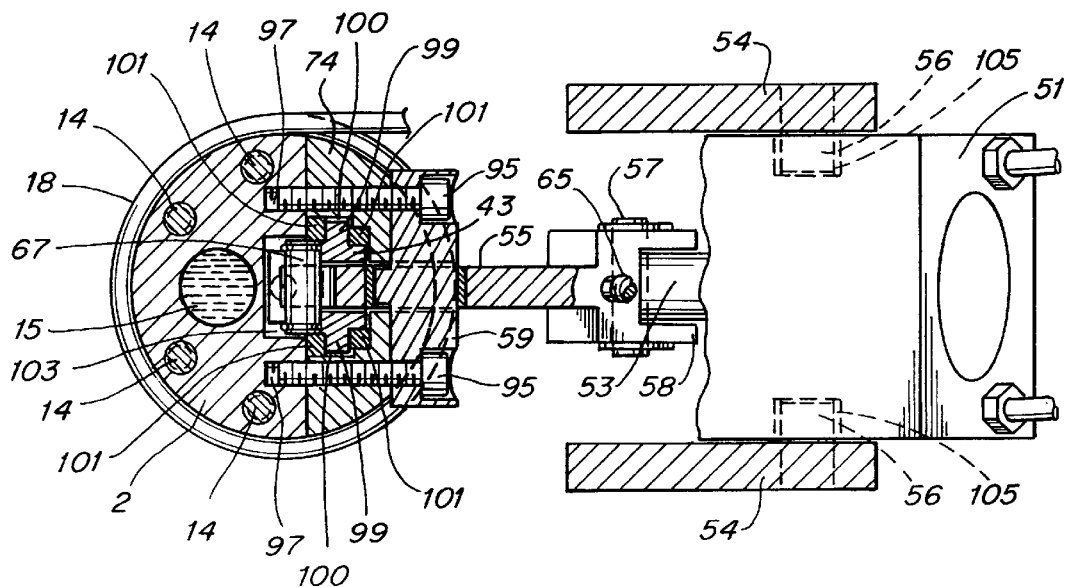
FIG. 8 shows cut-out cross-section of FIG. 1 along lines 8—8 of FIG. 1.

FIG. 8 shows a cut-out cross-section of FIG. 1 along lines 8—8 of FIG. 1. Rod 59 about which arm 55 is pivotally mounted is mounted to the nozzle body via screws 95 which pass through holes in the rod 59 to be received in threaded holes 97 of the nozzle body. The sled 43 includes wing-like sections 99 on either side which guides the sled when it is being displaced by rotation of the arm 55. The sections 99 are slidably engaged in a recess 100 of the nozzle body that forms slides 101 on either side of the sled to accommodate both sections 99 of the sled. Movement of the sled is limited by the slides 101 to longitudinal movement toward or away from the gate 9. The nozzle body includes recess 103 to accommodate the jaw 61 and the pin 67. The arms 54 that connect the cylinder to the mounting plate 60 are mounted on either side of the cylinder via rods 56 received in recesses 105 formed on the sides of the cylinder.

FIG. 9 is a fragmentary cross-sectional view taken along lines 9—9 of FIG. 3. End 58 of arm 55 has two sections 58a and 58b that sandwich around the piston 53 of the cylinder. The pin 57 passes through both sections 58a and 58b of the piston, to permit rotatable movement of both the arm 55 and the piston 53 with respect to one another. The screws 107 are used to mount the retaining wall 74 on the nozzle body 2.

Figure 11:
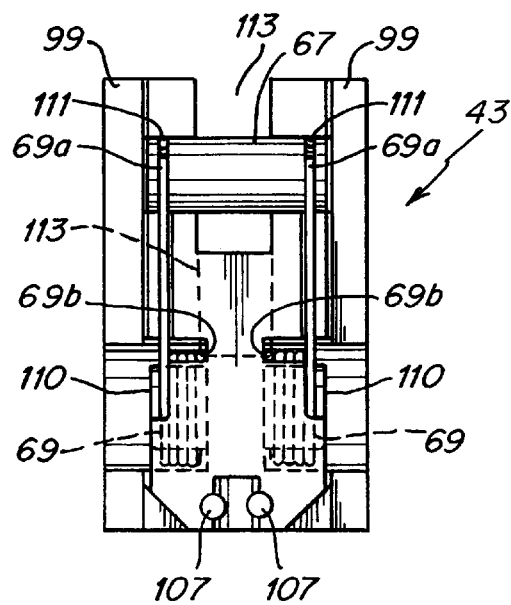
FIGS. 11 and 12 are respective front and side views of the sled used in the injection molding system of FIGS. 1–10.
Figure 12:
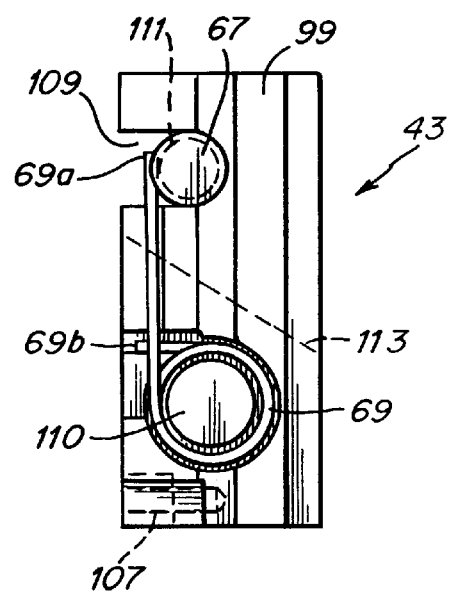

FIGS. 10–12 show the sled 43 used in the illustrative embodiment of the figures. The valve pin 17 is attached to the sled via pins 107 mounted in the sled. The pins engage semi-circular recesses in either side of the valve pin. The rolling pin 67 is mounted in a recess 109 in the sled. The rolling pin includes two annular groves 111 that each receive an end 69a of a torsion spring 69. Each torsion spring exerts a force against the groove of the rolling pin, forcing the rolling pin into the recess 109 of the sled. Each torsion spring is mounted on a cylindrical portion 110 of the sled, with the ends 69b of the torsion springs ending at an innermost portion of the cylindrical portion 110. A cut out portion 113 of the sled receives the jaw 61 of the arm 55 which engages the rolling pin 67.

Figure 13:
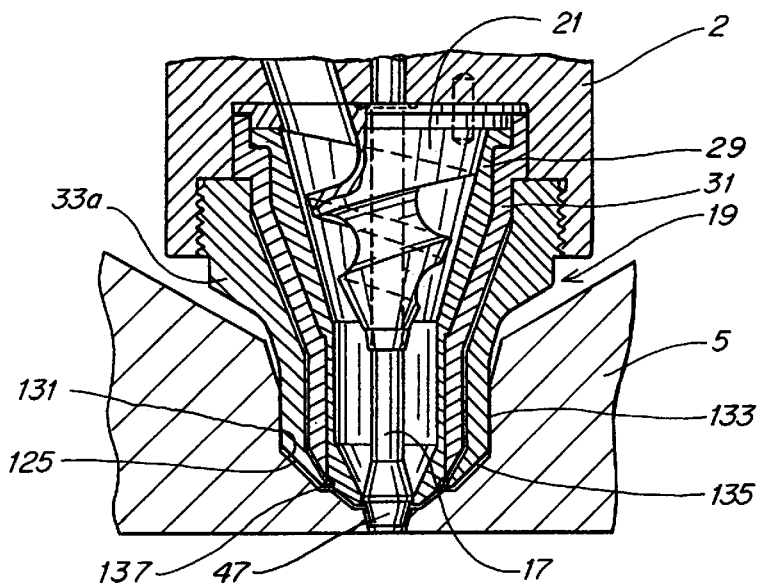
FIG. 13 is an alternative embodiment of the end assembly.

FIG. 13 shows an alternative embodiment of the end assembly 19 of the present invention. Inserts 21, 29 and 31, and valve pin 17, are substantially the same as the illustrative embodiment of FIGS. 1–12, however, tip 33 has a different shape to accommodate the different shape of the mold 5 which receives the gate 9 of the nozzle. In FIGS. 1–12 the opening in the mold was of a cylindrical shape and thus the outer portion of the tip 33 was cylindrical to seal with and form a flush surface with the inner surface of the cavity. As seen in FIG. 13, however, the mold 5 tapers inward at 131 to form an irregular shape for receiving the nozzle. The insert forms a seal with the mold at 133, while melt will leak into gap 135 when injection molding occurs, providing insulation from the mold. An O-ring seal 137 having a C-shaped cross-section prevents melt from leaking into insulative air gap 125 disposed between the tip 33a and the outer insert 31. The tip 33a of FIG. 13 is preferably formed of a low heat conductive material, such as stainless steel or titanium alloy, the outer insert 31 is preferably formed of a high heat conductive material such as beryllium copper, and the annular flow insert 21 and the inner insert 29 are preferably formed of an erosion resistant material such as hardened steel.

Figures 14, 15:
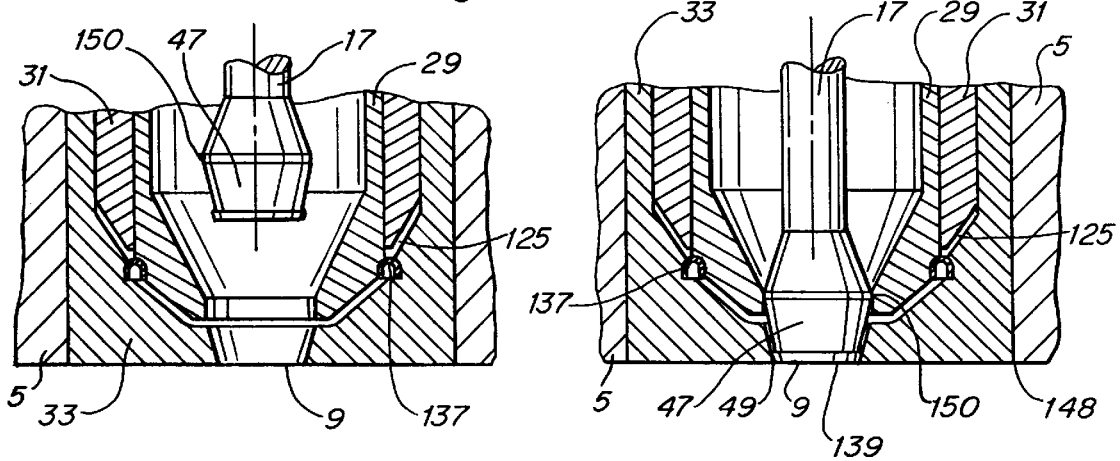
FIGS. 14 and 15 are enlarged fragmentary cross-sectional views of the end assembly of FIGS. 1–6, with the valve in the open and closed positions, respectively.
Figures 16, 17:
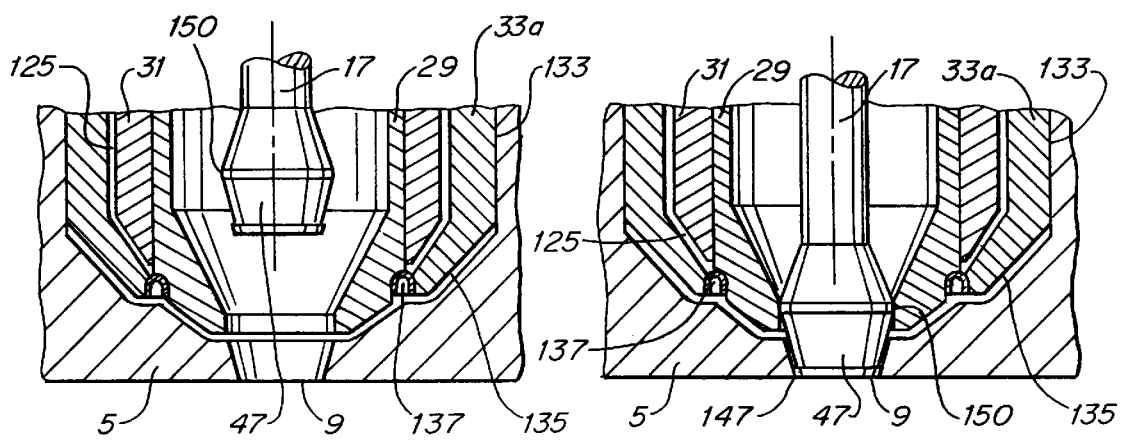
FIGS. 16 and 17 are enlarged fragmentary cross-sectional views of the end assembly of FIG. 13, with the valve in the open and closed positions, respectively.

FIGS. 14–17 are enlarged fragmentary cross-sectional views showing the sealing operation of the valve pin 17. FIGS. 14 and 15 show the first embodiment of the end assembly including the insert 33 as shown in FIGS. 1–12, while FIGS. 16 and 17 show the alternative embodiment of the end assembly using the insert 33a shown in FIG. 13. The valve pin is shown in the open position in FIGS. 14 and 16, and in the closed position in FIGS. 15 and 17. As seen in FIG. 15, the end 139 of the valve pin, and the end of the tip 33, are machined to be flush with the mold, so that the surface of the plastic article is smooth and consistent in the area about the gate 9. When the valve pin is in the closed position a seal 49 is formed with the tip 33. The seal 49 is formed by the edge of the head of the valve pin and the tip 33. This eliminates vestige and drooling from the gate and provides a smooth surface with the wall of the mold cavity.

FIG. 17 shows the valve pin in the closed position, using the end assembly of FIG. 13. The seal 147, however, is not made with the tip, rather, the seal is made with the mold 5 itself. The end of the valve pin is machined in this embodiment to match the surface of the mold, to provide a smooth surface that eliminates vestige and drooling at the gate of the mold cavity, and helps create a smooth surfaced plastic article in the area about the gate. An advantage of the gate and valve construction of FIG. 17 over FIG. 15, is that in FIG. 15 there is a "witness ring" formed in the plastic article at 148 where the tip seals with the mold, while in FIG. 17 only the valve pin itself seals with the mold. The tip 33 and mold of FIG. 17, however, are more complicated to machine.

Figure 19:
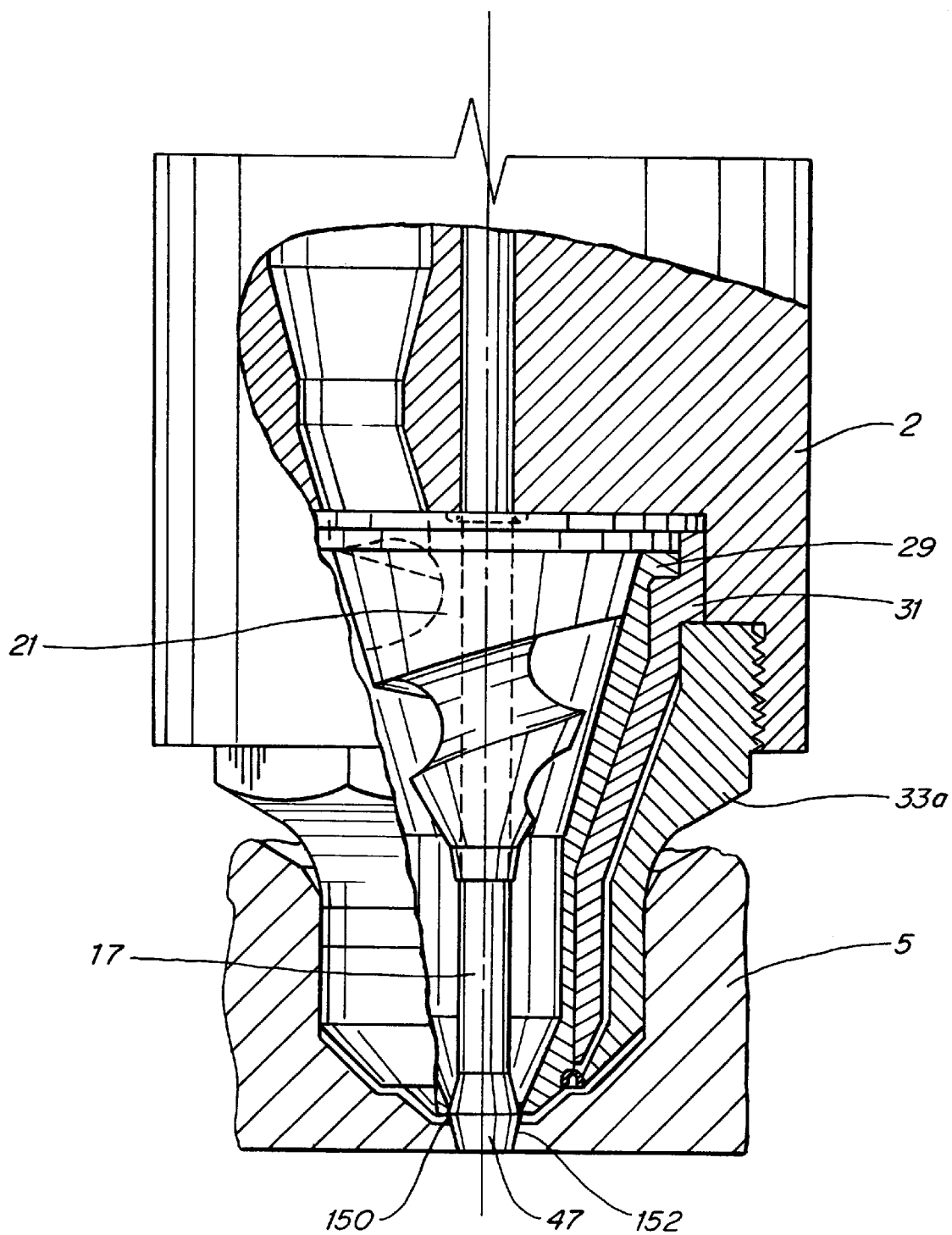
FIG. 19 is an alternative embodiment of the valve pin and end assembly.
Figure 20:
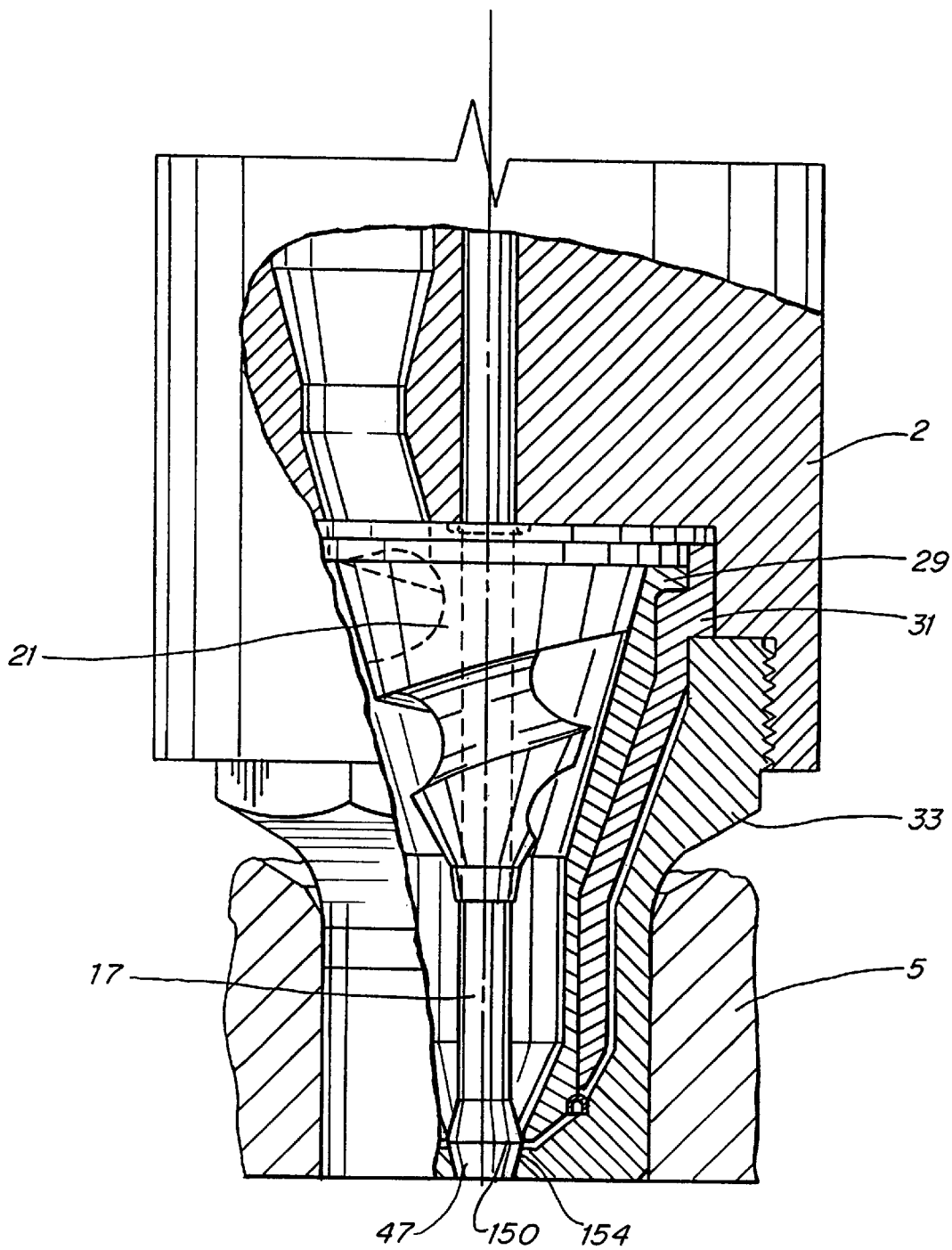
FIG. 20 is another alternative embodiment of the valve pin and end assembly.

It should be noted that the invention is not limited to the gate and tip configurations shown in FIGS. 1–17 and that other configurations are possible. For example, FIG. 19 shows a gate and tip configuration in which the edge 150 of the valve head 47 tapers straight down to the gate in the shape of a cylinder, unlike the head 47 of the valve pin of FIGS. 15 and 17 which tapers inward at an angle at edge 150. In FIG. 19, the seal 152 is formed with the side of the cylindrical portion of the valve head and the mold 5. This type of valve head configuration could also be used with a tip similar the tip of FIG. 15, as shown in FIG. 20. In FIG. 20 the valve head 47 forms a seal 154 with the tip 33. As seen in FIGS. 19 and 20, the sealing area of the seals 152 and 154 is greater that the sealing area of seals 49 and 147 of FIGS. 15 and 17, respectively. Furthermore, as long as a portion of the cylindrical portion of the valve head 47 is contacting the inner surface of the mold in FIG. 19, or the inner surface of the tip in FIG. 20, a seal will be formed. Use of the set screw 65 shown in FIGS. 1–3 to effect sealing and prevent damage at the gate is not needed for these purposes as there is a wide margin for error in which the valve head could past through the gate into the mold, or stop short of the inner surface of the mold cavity, and still form an effective seal. Thus, in the valve head arrangement of FIGS. 19 and 20, drooling is not a problem and the set screw 65 is only needed for cosmetic purposes to set the end of the valve even with the mold (FIG. 19) or tip (FIG. 20) to reduce vestige on the plastic article. The valve head and tip assemblies of FIGS. 19 and 20 are useful in injection molding of crystalline polymers, for example.

Figure 18:
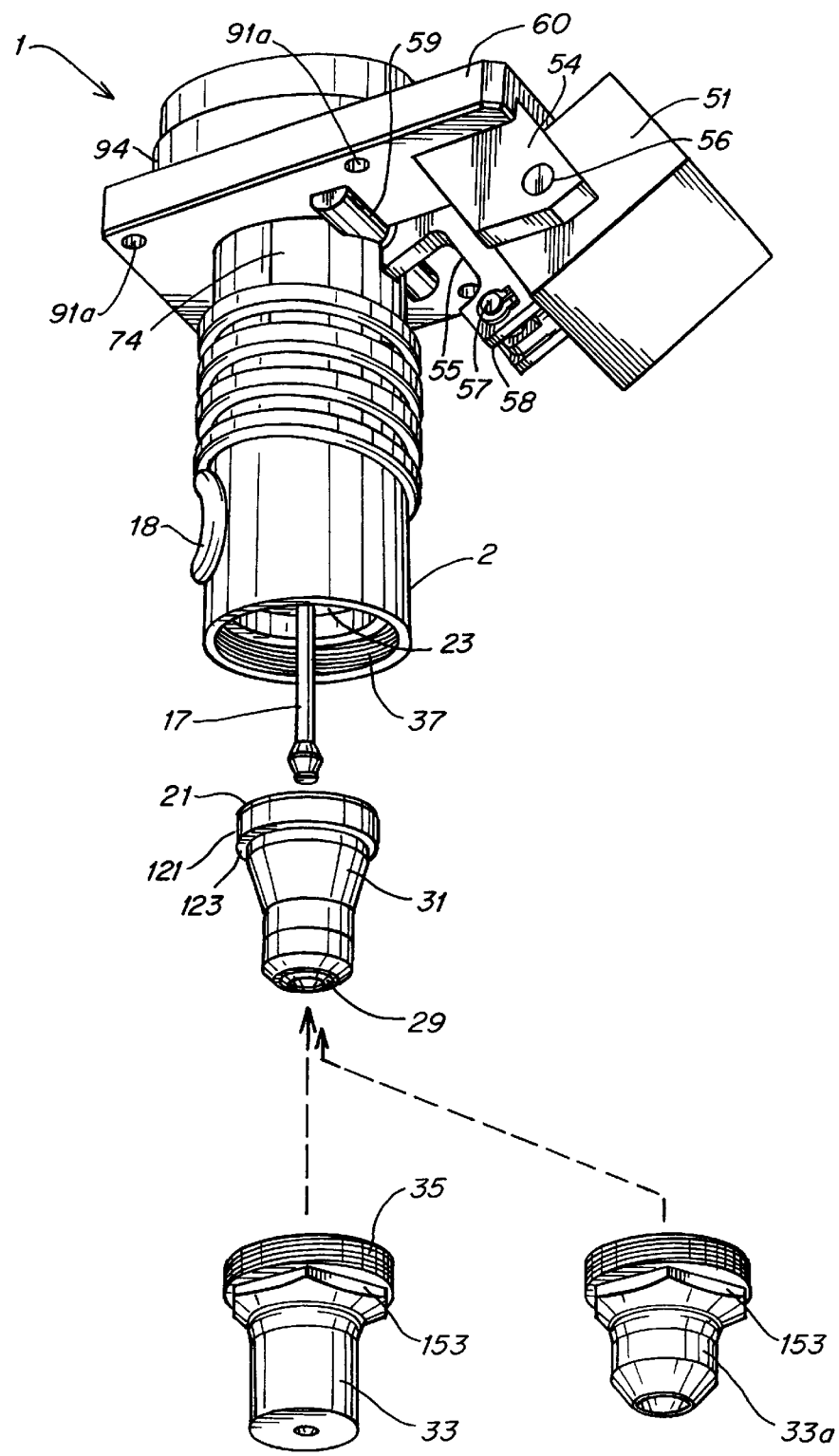
FIG. 18 is an exploded view of the injection molding system of FIG. 1, using either the end assembly of FIGS. 1–6 or the end assembly of FIG. 13.

FIG. 18 shows a partially exploded view of the injection molding assembly of FIG. 1. The annular flow insert 21 and the inner insert 29 are assembled inside the outer insert 31. The top section of the annular flow insert 21 is visible as it sits inside the outer insert. The tip of the inner insert 29 is visible as it slightly protrudes past the end of the outer insert. Both embodiments 33 and 33a of the tip are shown. Both are compatible with the injection molding system shown, as both can receive the outer insert 31 and both have threads 35 for mating with threaded portion 37 of the nozzle body 2. Screw holes 91a of the mounting plate 60 are for receiving screws 91 (FIG. 7) for securing the injection molding system 1 to the mold. Each tip also includes a hexagonal section 153 used to assist in screwing the tip into the nozzle body.

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereof.

What is claimed is:

1. An injection molding apparatus, comprising:

a nozzle having an inner bore that defines a melt channel extending therethrough and terminating at a gate;

a valve pin to open and close the gate;

an actuator coupled to the valve pin for causing longitudinal displacement of the valve pin; and a flow insert disposed in said inner bore through which the valve pin extends, said flow insert having an outer surface with an annularly directed groove disposed there on for directing melt flow thereabout and toward the gate, wherein a melt-flow space is provided between said outer surface of the flow insert and said inner bore along the full length of said outer surface that said annularly directed groove is disposed thereon.

2. The apparatus of claim 1, wherein the valve pin forms a seal with an inner surface of the flow insert.

3. The apparatus of claim 1, wherein the nozzle includes a support member, the support member defining a section of the inner bore in which said flow insert is disposed, wherein said melt-flow space is defined between said support member and said outer surface of said flow insert.

4. The apparatus of claim 3, wherein the section of the inner bore defined by said support member tapers from a larger diameter more remote from said gate to a smaller diameter closer to said gate.

5. The apparatus of claim 1, wherein an outer edge of the groove gradually recedes from the wall of the melt channel the closer the edge is to the gate.

6. The apparatus of claim 1, wherein the flow insert has an opening through which the melt channel extends, the opening leading to the groove.

7. The apparatus of claim 6, wherein the flow insert has a plurality of openings all for receiving a portion of the melt flow.

8. The apparatus of claim 1, wherein the flow insert has a plurality of annularly directed grooves.

9. The apparatus of claim 1, in combination with a plurality of like injection molding apparatuses coupled to a manifold.

10. The apparatus of claim 1 wherein the flow insert is received in a recess of the nozzle and the apparatus further comprises a tip for securing said flow insert in said recess.

11. The apparatus of claim 1 wherein said melt-flow space progressively widens from a position more remote to a position closer to said gate.

12. An injection molding apparatus, comprising:

a nozzle body having a melt channel extending therethrough;

a nozzle tip to be seated in a mold, wherein a gate to a cavity of the mold is to be formed by one of the mold and the nozzle tip;

a valve pin for opening and closing the gate;

an actuator coupled to the valve pin for causing longitudinal displacement of the valve pin;

a flow insert through which the valve pin extends, said flow insert having an outer surface with an annularly directed groove disposed thereon defining part of a melt flow path;

an inner insert supported in the nozzle tip and having an inner bore defining at least another part of the melt flow path; and and an outer insert intermediate said inner insert and said nozzle tip.

13. The apparatus of claim 12, wherein there is an insulation space between said outer insert and said nozzle tip.

14. The apparatus of claim 12, wherein said annularly directed groove is defined in part by a groove edge that is spaced from said inner insert along its full length.

15. The apparatus of claim 14, wherein the space between the inner insert and the groove edge progressively widens from a position more remote to a position closer to the gate.

16. An injection molding apparatus, comprising:
a nozzle having a bore that defines a melt channel extending therethrough and terminating at a gate to a mold;
a valve pin for opening and closing the gate;
an actuator coupled to the valve pin for causing longitudinal displacement of the valve pin;
a flow insert disposed in said nozzle through which the valve pin extends, said flow insert having an outer surface with an annularly directed groove disposed thereon for directing melt-flow thereabout and toward the gate, the annularly directed groove defined in part by a groove edge, wherein a melt-flow space is provided between said groove edge and a surface of said bore, and said melt-flow space progressively widens from a position more remote to a position closer to said gate.

17. The apparatus of claim 16, wherein the melt flow space is provided along the entire length of said groove edge.

18. The apparatus of claim 17, wherein the nozzle includes a support member disposed about the flow insert, wherein the melt-flow space is defined between said support member and said groove edge.

19. The apparatus of claim 16, wherein the nozzle includes a support member disposed about the flow insert, wherein the melt-flow space is defined between said support member and said groove edge.

20. The apparatus of claim 19, wherein said support member includes an inner insert and a nozzle tip, wherein the inner insert is supported in the nozzle tip and the inner insert includes an inner bore defining a part of the melt channel.

21. The apparatus of claim 20, wherein the support member further includes an outer insert intermediate said inner insert and said nozzle tip.

22. The apparatus of claim 21, wherein an insulation space is provided between said outer insert and said nozzle tip.

23. The apparatus of claim 16, wherein the valve pin forms a seal with an inner bore of the flow insert through which the valve pin reciprocates.

24. The apparatus of claim 16, wherein the flow insert has an opening through which the melt channel extends, the opening leading to the groove.

25. The apparatus of claim 16, wherein the flow insert has a plurality of openings for receiving a portion of the melt flow.

26. The apparatus of claim 25, wherein said flow insert has a plurality of annularly directed grooves.

27. The apparatus of claim 16, in combination with a plurality of like injection molding apparatuses coupled to a manifold.

28. The apparatus of claim 16 wherein the flow insert has a bore for receiving the valve pin, said flow insert bore formed separate from the outer surface of the flow insert.

* * * * *